May 27, 1958 J. F. OURY 2,836,311
APPARATUS FOR HANDLING BLOCK MATERIAL
Filed Sept. 10, 1956 11 Sheets-Sheet 1

Inventor.
J. Foster Oury.
By Wilkinson, Huxley, Byron & Hume
Atty.

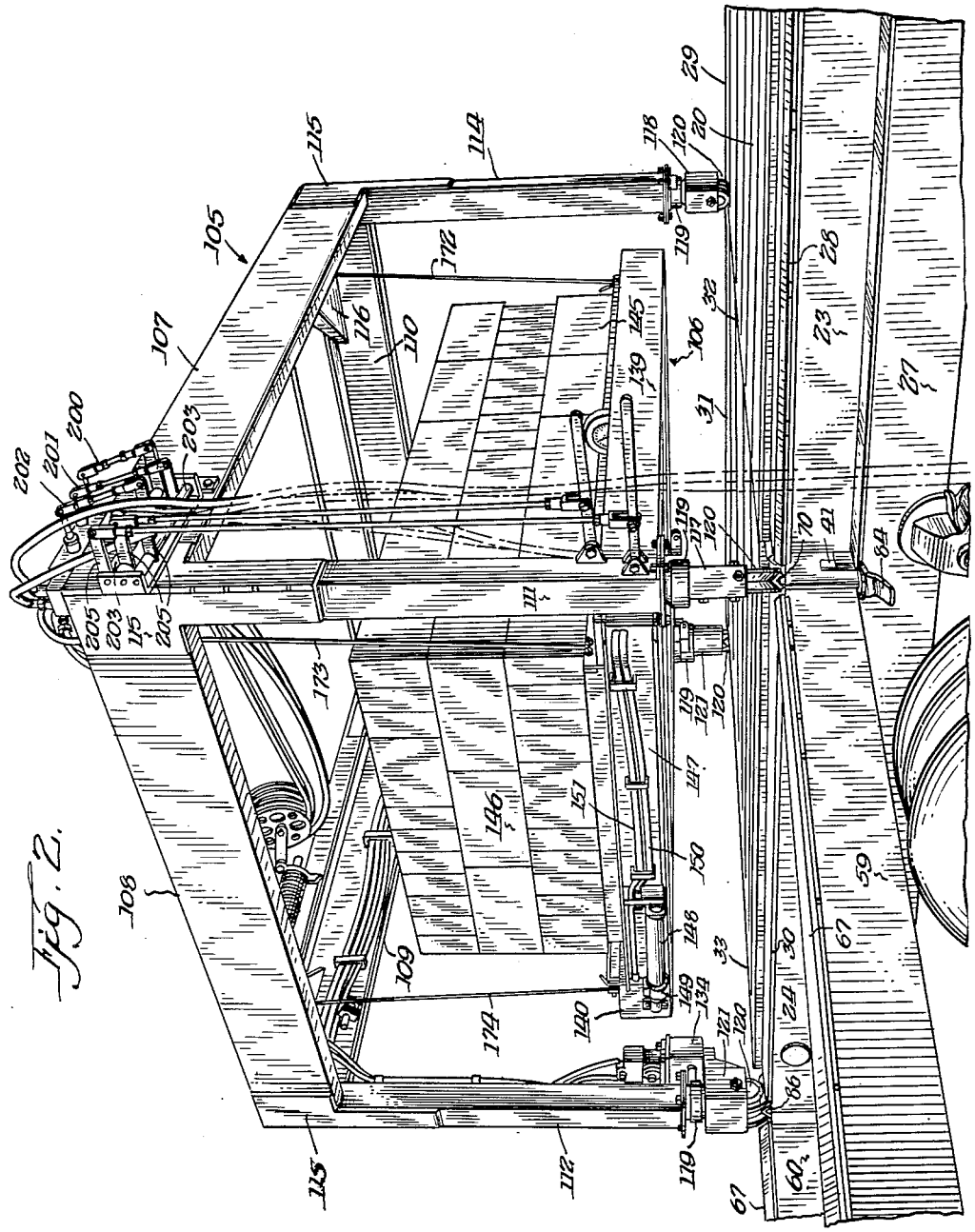

May 27, 1958 J. F. OURY 2,836,311
APPARATUS FOR HANDLING BLOCK MATERIAL
Filed Sept. 10, 1956 11 Sheets-Sheet 3
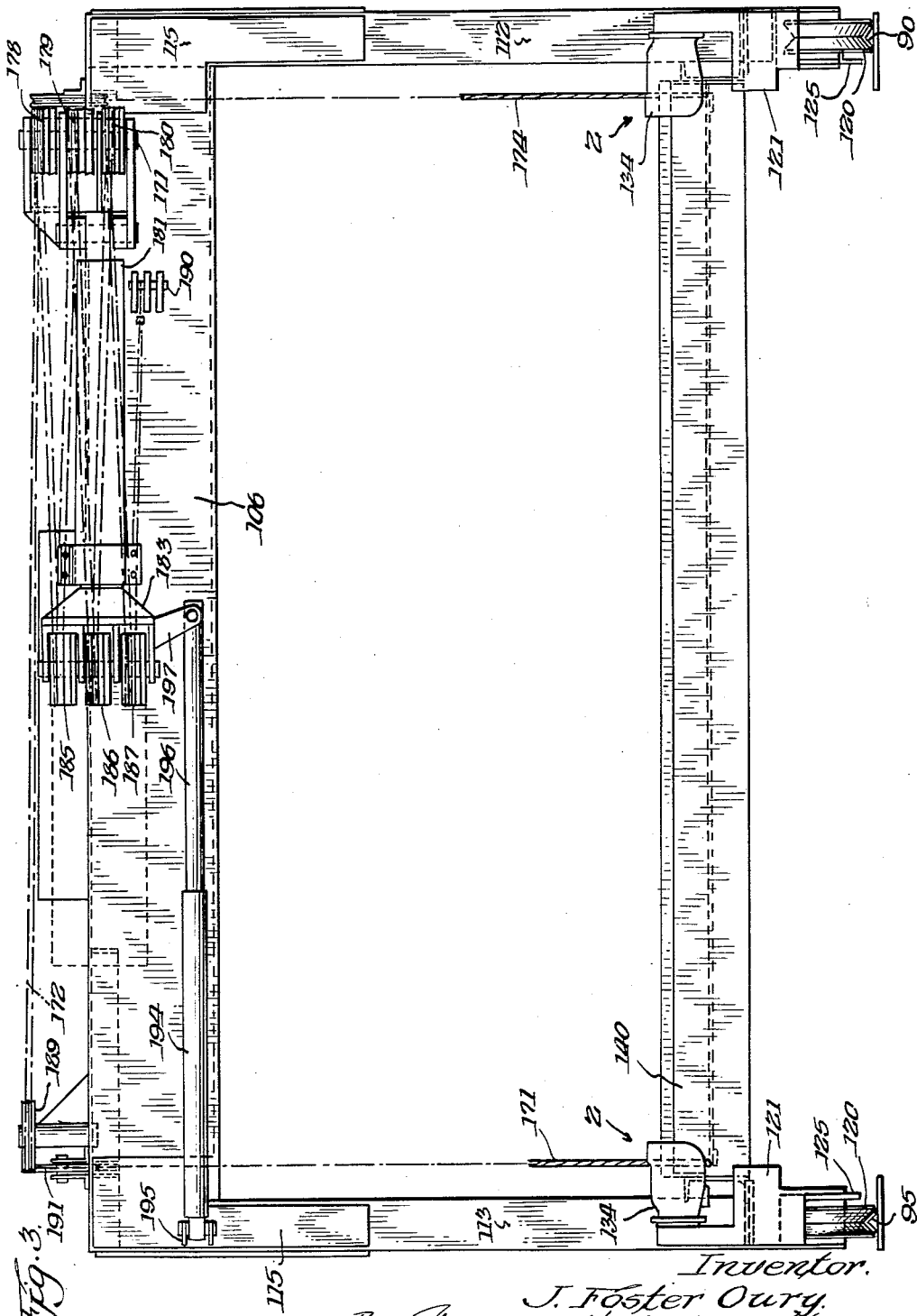

May 27, 1958 J. F. OURY 2,836,311
APPARATUS FOR HANDLING BLOCK MATERIAL
Filed Sept. 10, 1956 11 Sheets-Sheet 4
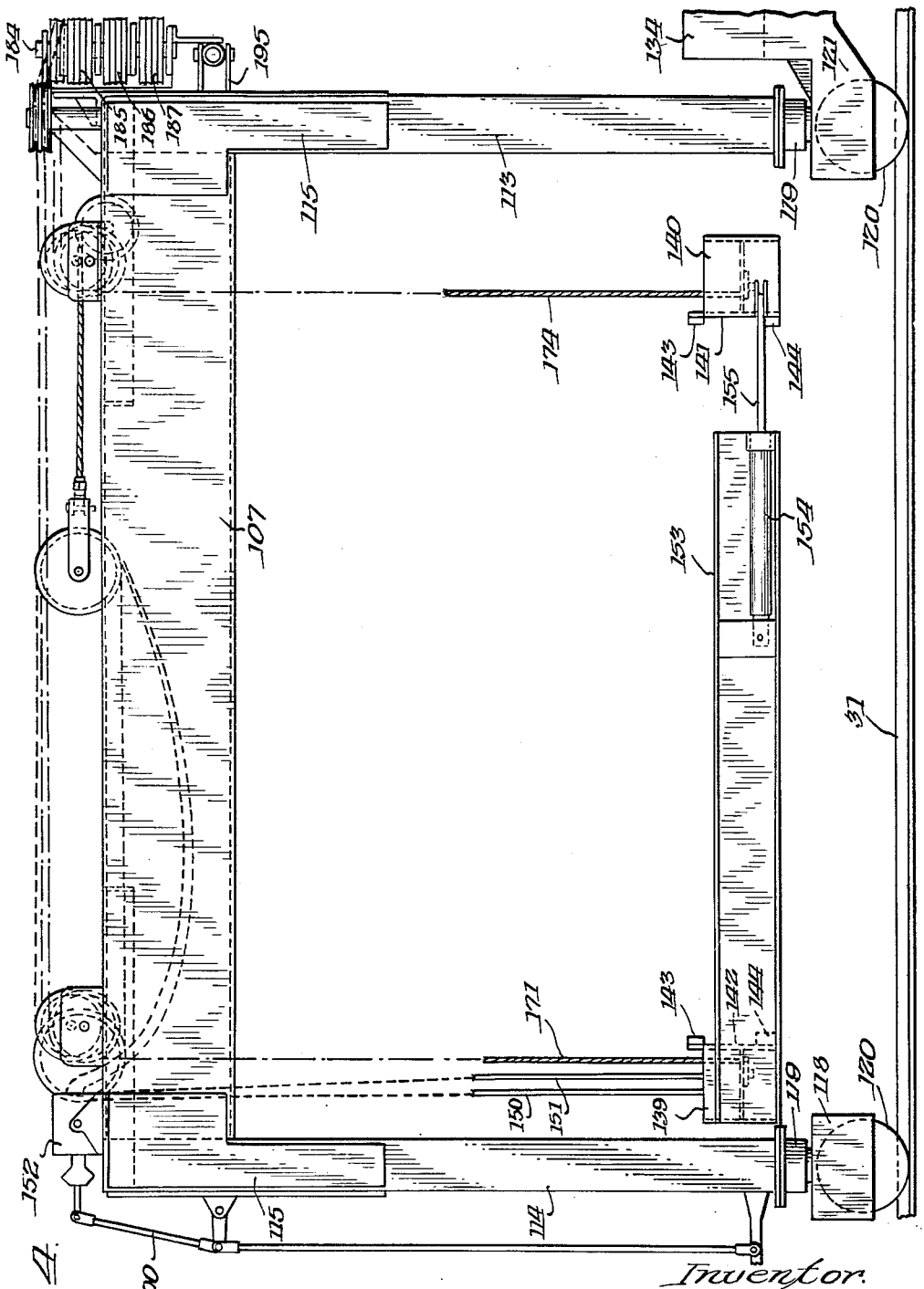

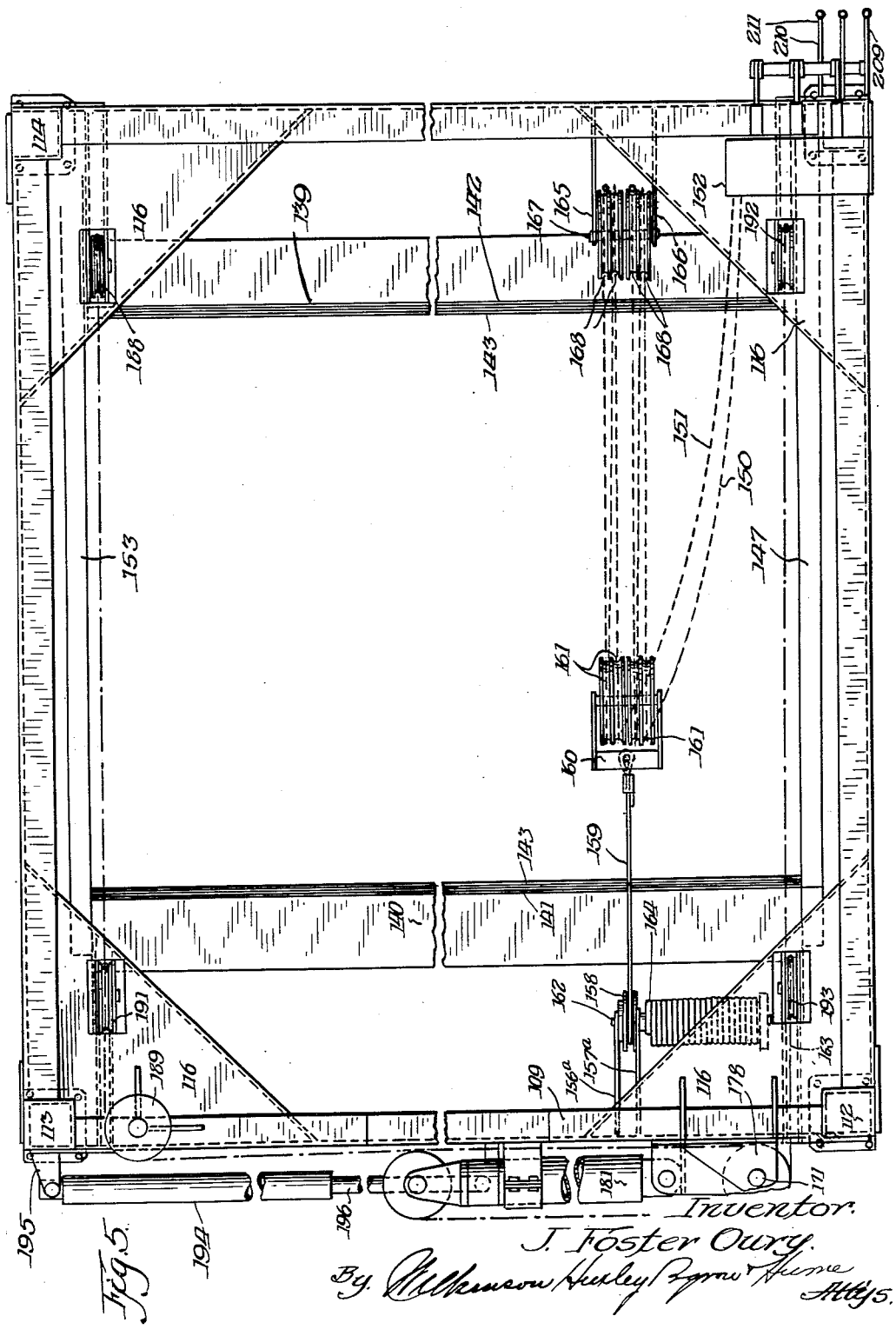

May 27, 1958 J. F. OURY 2,836,311
APPARATUS FOR HANDLING BLOCK MATERIAL
Filed Sept. 10, 1956 11 Sheets-Sheet 6
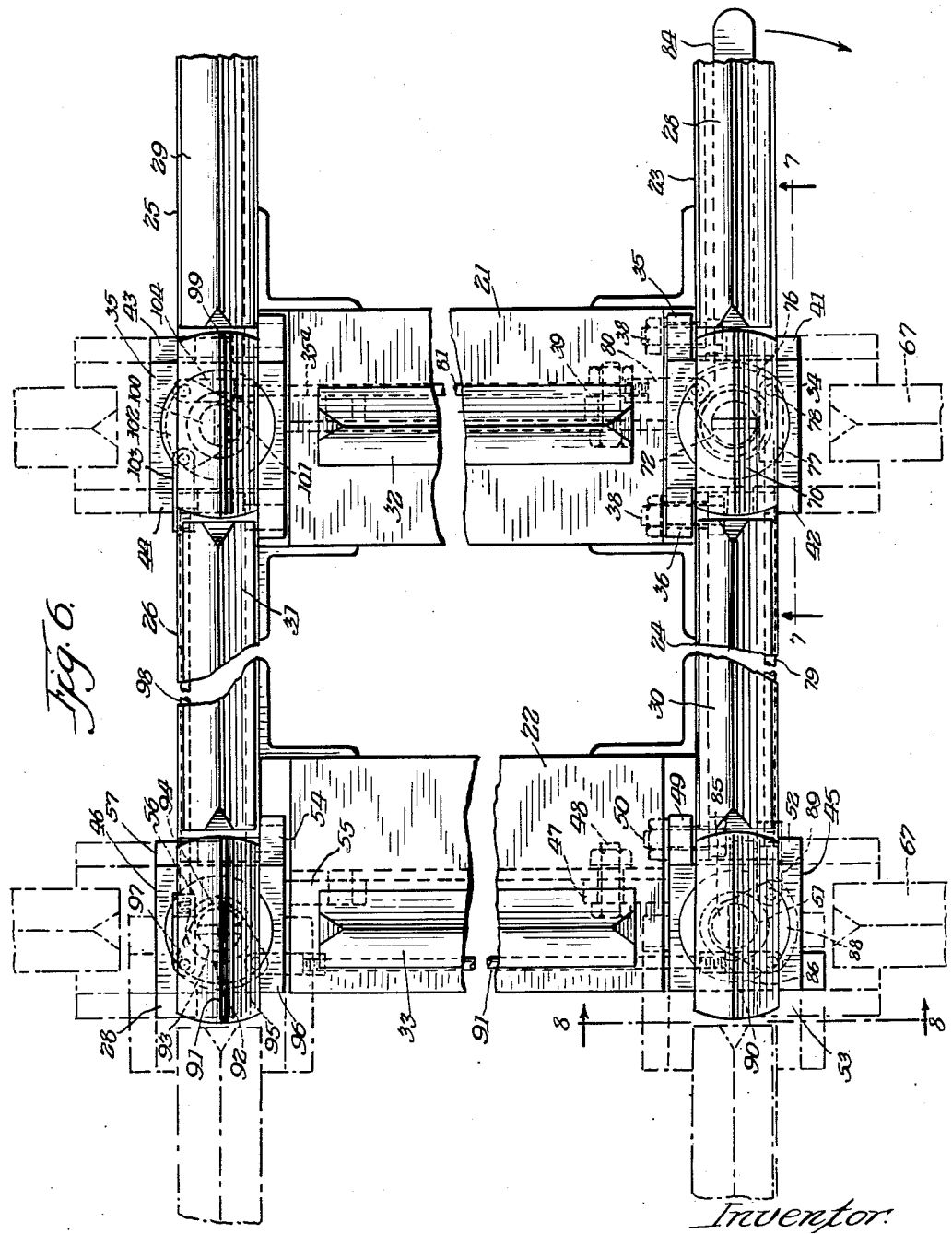
Inventor:
J. Foster Oury.
By Wilkinson, Huxley, Byron & Hume
Attys.

May 27, 1958 J. F. OURY 2,836,311
APPARATUS FOR HANDLING BLOCK MATERIAL
Filed Sept. 10, 1956 11 Sheets-Sheet 7
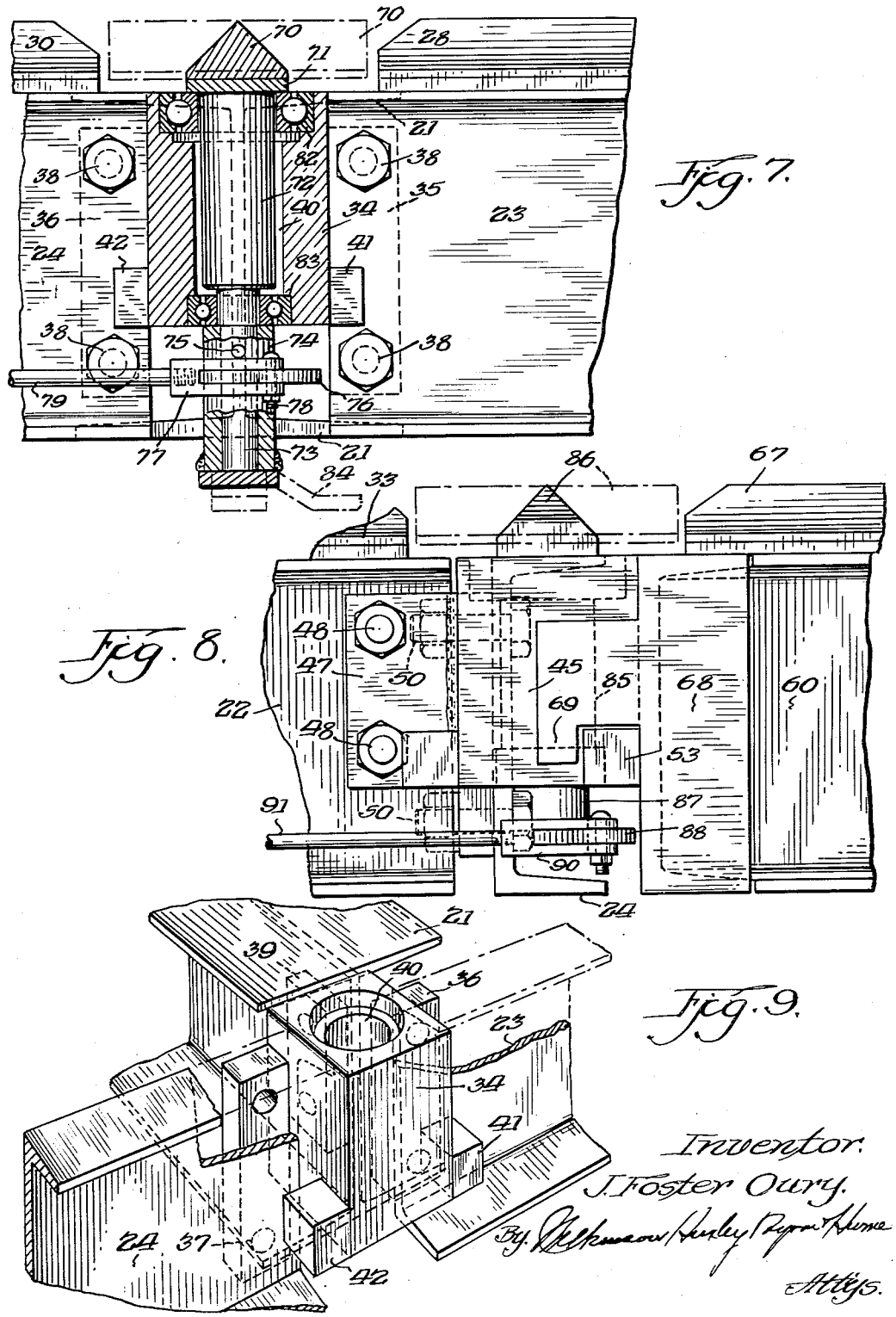

May 27, 1958 J. F. OURY 2,836,311
APPARATUS FOR HANDLING BLOCK MATERIAL
Filed Sept. 10, 1956 11 Sheets-Sheet 8

Inventor:
J. Foster Oury.

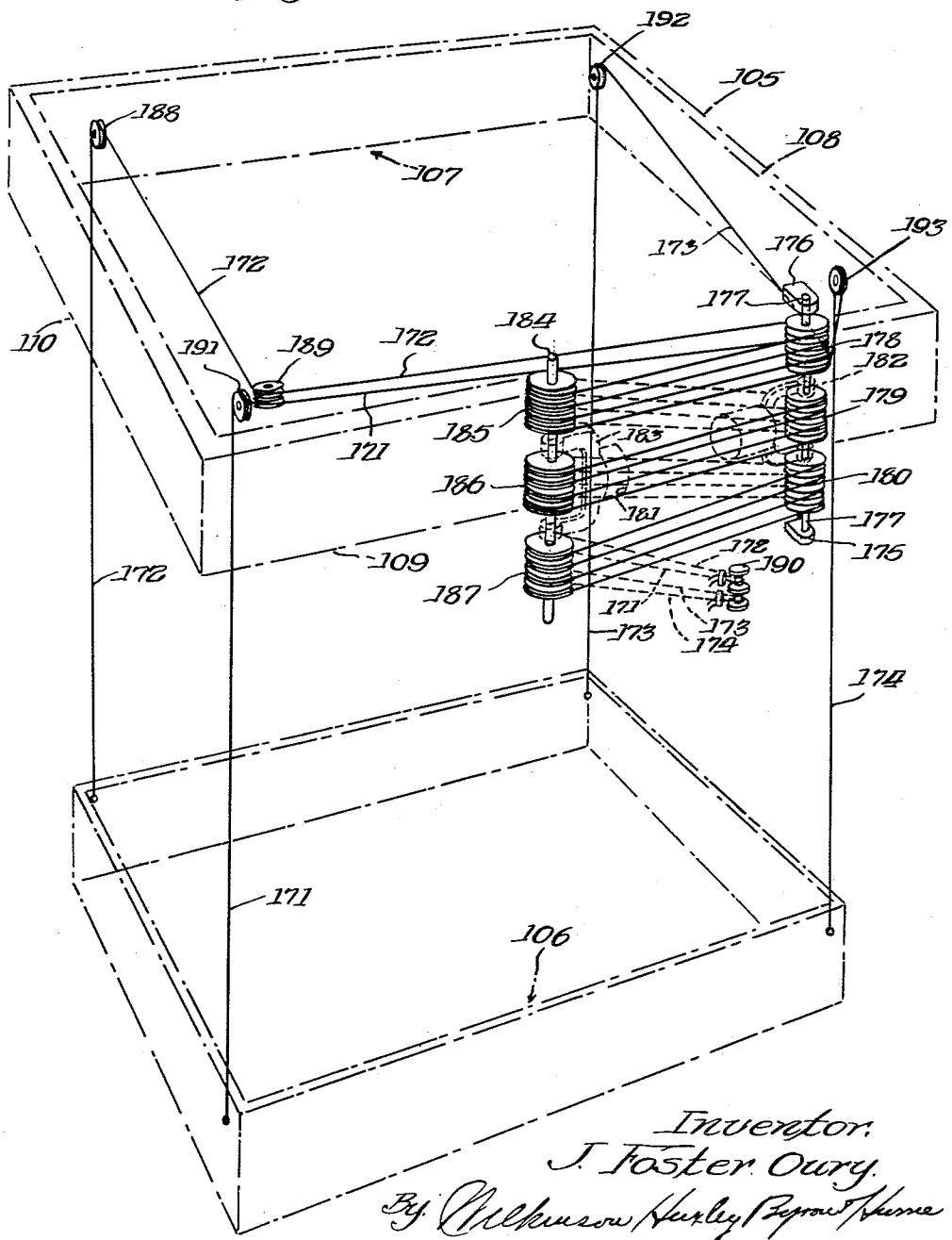

May 27, 1958 J. F. OURY 2,836,311
APPARATUS FOR HANDLING BLOCK MATERIAL
Filed Sept. 10, 1956 11 Sheets-Sheet 10
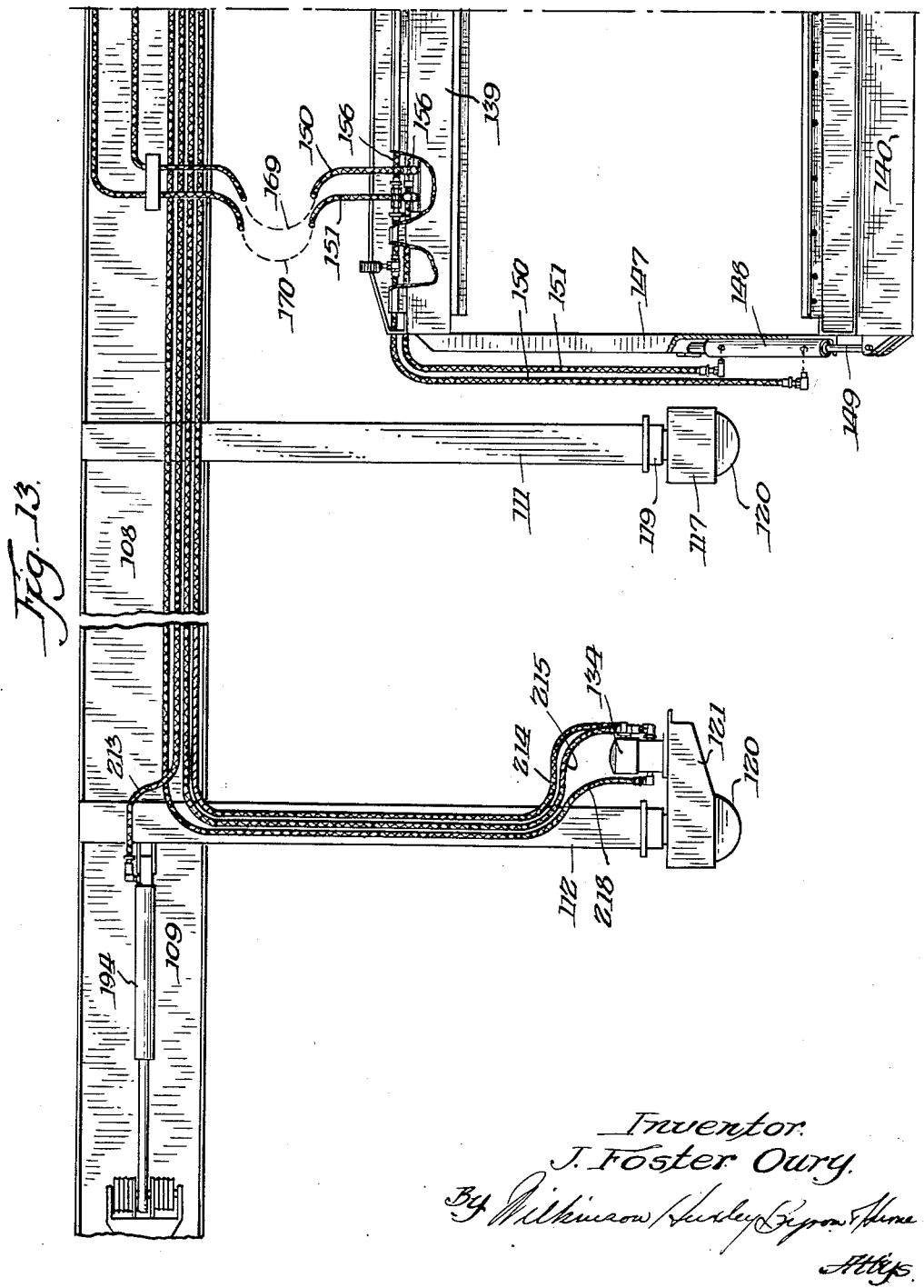

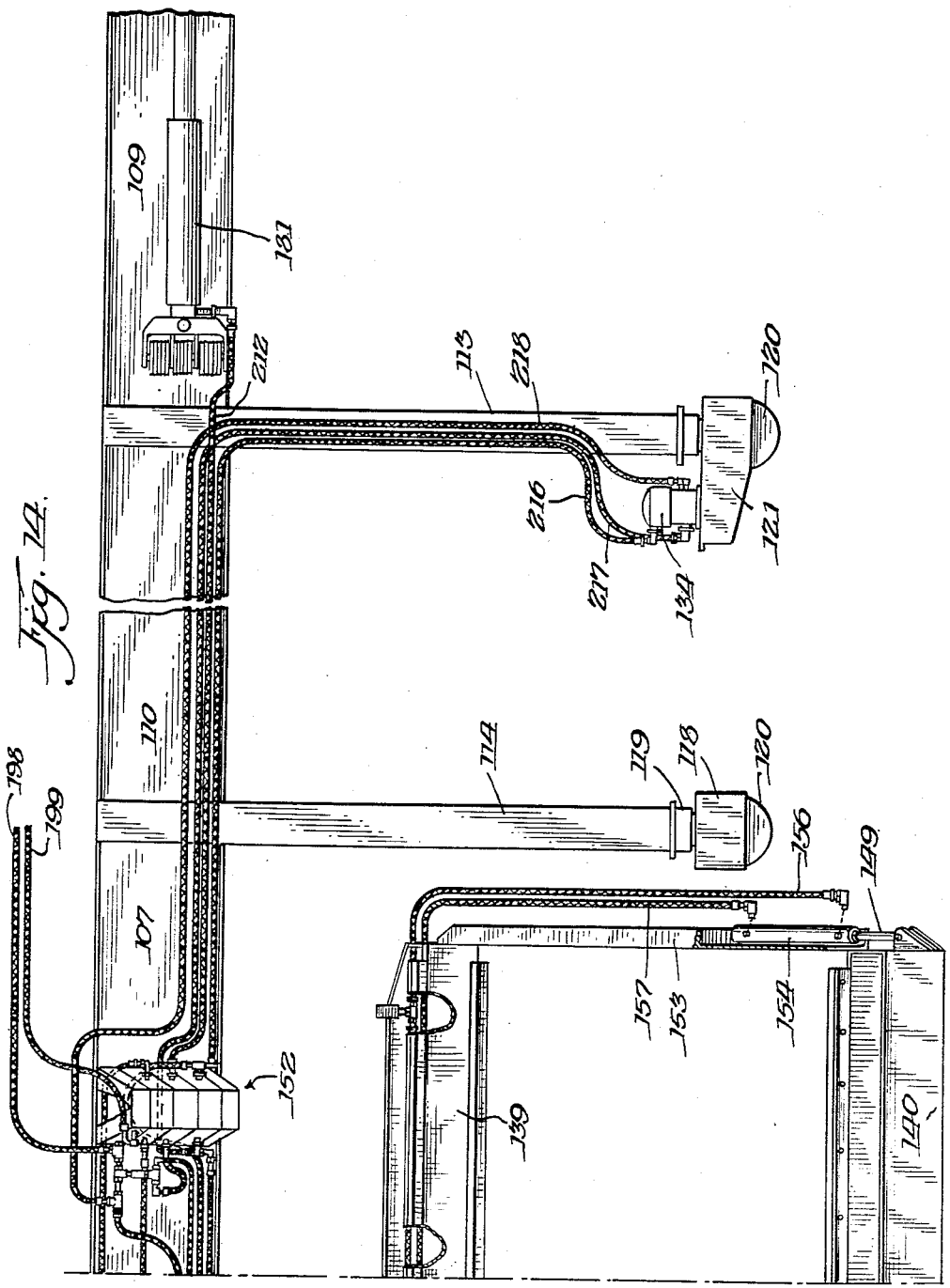

United States Patent Office 2,836,311
Patented May 27, 1958

2,836,311

APPARATUS FOR HANDLING BLOCK MATERIAL

John Foster Oury, Northlake, Ill.

Application September 10, 1956, Serial No. 608,763

7 Claims. (Cl. 214—75)

My invention relates to a handling and transporting apparatus for block material such as cinder blocks, concrete blocks, tile blocks, brick, etc. which may be mechanically loaded in cube form upon a vehicle such as a truck and hauled to a destination and there mechanically unloaded, in which the manual handling of such cubes is dispensed with.

Another object of my invention is the provision of apparatus for the mechanical handling of material in block form in unit or cube groups for loading onto a truck, for transportation to places of use or places of storage and unloading of unit groups onto the ground at the places of use or yards for storage purposes in such manner and arrangement whereby the cubes can be reloaded, if desired, for transportation to a place of use, with no manual labor involved except the minor amount involved in handling the various controls connected with the apparatus.

Another and further object of my invention is the provision of an apparatus for the handling of cubes made up of a plurality of block material stacked into generally rectangular form and in which a squeeze frame is placed around the cube unit and the squeeze frame applied to the bottom layer of blocks, with sufficient horizontal pressure being applied thereto whereby the bottom layer becomes a pallet for the support of the layers of blocks stacked above it and the unit in this form is raised while pressure is retained on the squeeze frame high enough to be placed upon a transport truck to be carried to the proper position for loading and the cube units removed from the truck, lowered to the floor or to the ground, the squeeze frame removed and attached to another cube unit which may be moved and stacked on top of the first unit, if desired, for storage purposes, without the manual handling of any of the materials.

Another and further object of my invention is the provision of a block handling device in which blocks of various shapes and sizes can be handled without mechanical pallets, bars or other special attachments so long as the blocks, etc. can be placed into units to which sufficient lateral pressure can be applied so that the lower layed becomes a pallet for supporting the other blocks, or the like, making up the balance of the cube.

Another and further object of my invention is the provision of a block handling and transfer apparatus in which the cubes can be handled, can be raised or lowered slowly and handled very gently without danger of breaking the cubes, fracturing the edges, or the like, rendering the cubes unsuitable for use in building construction, with an entirely mechanical apparatus, without the necessity of any manual handling of the cubes whatsoever.

Another and further object of my invention is the provision of a block handling apparatus in which a cube unit is suspended upon a plurality of cables in such manner that the unit has stability during the handling operation and in which the cube is not apt to disintegrate because of the character and type of pressure used for creating a pallet for the conveyance of the unit, so that time can be materially saved, because a truck can be mechanically loaded and unloaded in a few minutes which if done manually would require many more units of time, resulting in decreased costs of construction, and saving of both time and labor in the transporting and placing in condition for use such building materials.

These and other objects of my invention will be more fully and better understood by reference to the accompanying drawings and in which—

Fig. 2 is a perspective view of a portion of the rear end of a truck, a portion of the outrigger mechanism of my improved block handling and transporting mechanism showing the track segments in partially turned position and showing the front side and one end of the carriage.

Fig. 3 is an elevational view of the rear side of the block handling and carrier mechanism as seen from the rear of the truck.

Fig. 4 is an elevational view of one end of the block handling mechanism showing the opposite end of the carriage to that shown in Figs. 1 and 2.

Fig. 5 is a top plan view of the transporting carriage and the squeeze frame.

Fig. 6 is a detailed plan view of the track sections and the caster mounting for the transporting frame and apparatus for turning the movable track sections.

Fig. 7 is a detailed view partially in section of one of the movable track sections and the control means therefor.

Fig. 8 is a detailed vertical elevational view of the movable track segment for one corner of the truck, taken on lines 8—8 of Fig. 6.

Fig. 9 is a perspective view of the housing for the movable track section shown in Fig. 7 of the drawings.

Fig. 12 is a diagrammatic view showing the suspension means for the squeeze frame and operating means for raising and lowering the squeeze frame.

Figure 1:
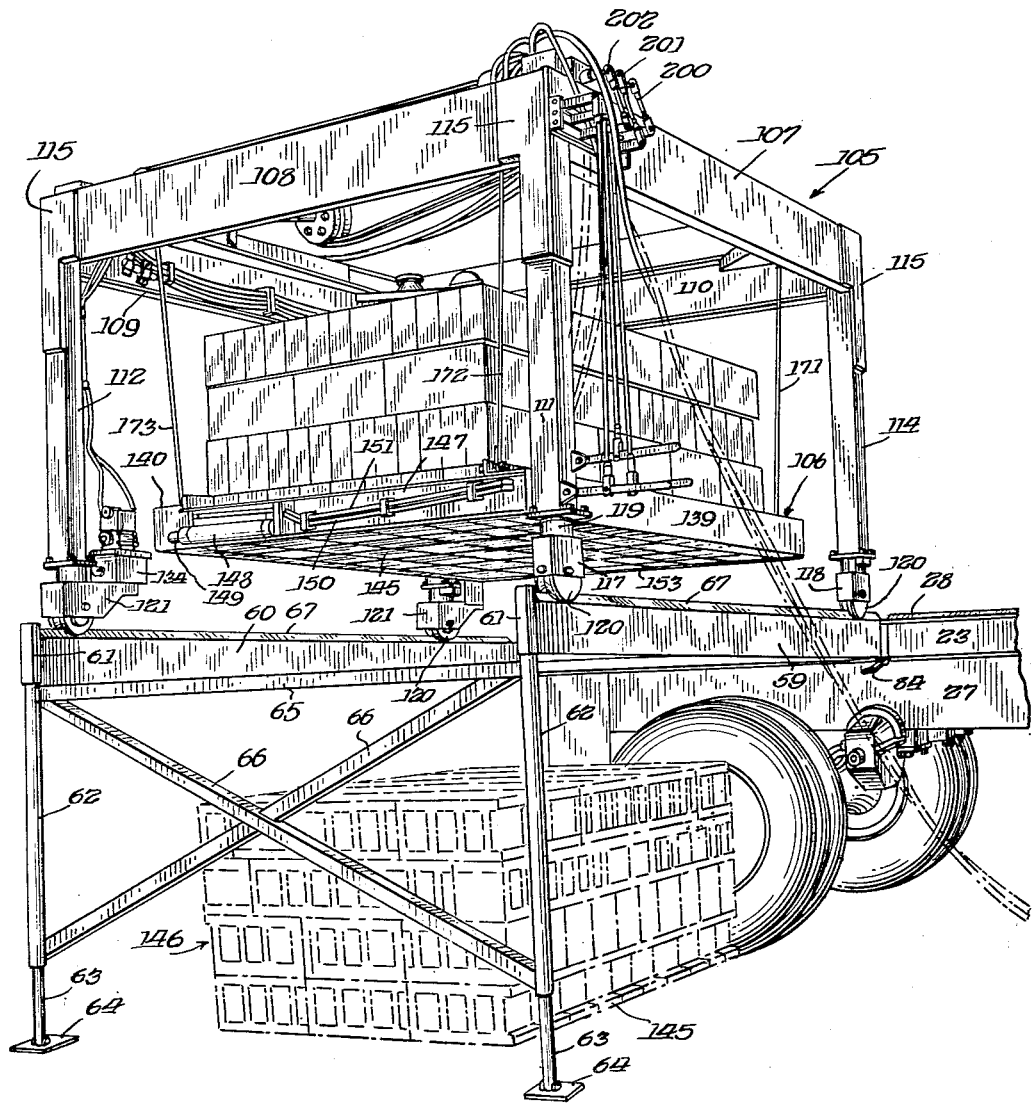
Fig. 1 is a perspective view of the rear end of a truck with outrigger mechanism secured thereto and showing the front side and one end of my improved block handling carriage mounted thereon.

Fig. 13 and Fig. 14 taken together are diagrammatic views of the power operating and control means for the carriage and squeeze frame.

Referring now particularly to the drawings and in which like reference characters refer to like parts throughout, the apparatus consists generally of a handling carriage having a squeeze frame mounted thereon, a truck for transporting the handling carriage and squeeze frame and the unit cubes, and an outrigger frame secured to the end or side of the truck body which supports the carriage when it is rolled off the truck for the purpose of lifting or depositing a unit cube on the ground or for the purpose of depositing one unit cube on top of another.

The truck is of the usual commercial type of the platform trailer variety and which has a platform bottom 20 which rests upon transversely spaced support beams such as 21 and 22 and other similar transverse beams (not shown) and partially upon longitudinal side channels 23 and 24 in spaced end-to-end relation with each other at one of the sides of the platform 20, and side channels 25 and 26 on the opposite side of the platform 20 in spaced end-to-end aligned relation with each other. The channels 23 and 24 are mounted on their edges upon an outer longitudinal beam 27 at one side of the platform 20 and the side channels 25 and 26 are mounted upon a similar outer beam (not shown) at the opposite side of the platform 20, which outer beam 27 and other spaced similar longitudinal beams extend from one end of the platform 20 of the truck to the other. The rear ends of the channels 23 and 24 terminate short of the web of the cross beam 21, while the front ends of the side channels 25 and 26 terminate short of the web of the beam 21 and at their rear end short of the web of the cross beam 22.

Track rails 28 and 29, triangular in cross section, are mounted on the side channels 23 and 25 and extend from the forward end of the platform 20 to a point slightly short of the ends of the side channels 23 and 25. Other track rails 30 and 31, also triangular in cross-section, are mounted upon the side channels 24 and 26 respectively, in longitudinal alignment with the track rails 28 and 29 respectively, which said track rails 30 and 31 terminate slightly short of each end of each of the side channels 24 and 26. A cross track rail 32, also triangular in cross-section, is mounted on the cross beam 21, while a second track rail 33, also triangular in cross-section, is mounted on the top of the cross beam 22 and extends parallel therewith. The track rail 32 terminates at each of its ends short of a projected line between the centers of the rails 28 and 30 and the rails 29 and 31 one-half the distance between the spaced adjacent ends of the rails 28 and 30 and the rails 29 and 31. The cross track rail 33 terminates at each of its ends short of projected lines extending longitudinally from the centers of the track rails 30 and 32 and 31 and 39 by one-half the length of short movable rails hereinafter described.

Housings 34 and 35 are provided on each side of the truck body intermediate its ends and are secured to the rear ends of the channels 23 and 25 respectively and to the forward ends of the channels 24 and 26 respectively, with the housing 34 being secured to one end of the cross beam 21 and the housing 35 to the other end of the beam 21. These housings 34 and 35 are alike but are mounted on opposite sides of the platform 20—the housing 34 being for the right side of the truck as seen from the rear thereof facing the cab and being illustrated in detail in Figs. 7 and 9 of the drawings, while the housing 35 is mounted on the opposite side of the platform 20 and is turned 180° with respect to the housing 34 in its mounted position.

The housing 34 has a pair of blocks 36 and 37 welded to the front and rear side wall of the housing 34 and which extend behind the channels 23 and 24 and are secured to these channels by bolts 38, 38 which extend through the blocks 36 and 37 and through the webs of the channels 23 and 24 respectively, and has an extension 39 on its inner side which is fitted against the web of the cross member 21 and bolted thereto, so that in effect the housing 34 forms a connecting member for the channels 22 and 23, and the cross member 21 at their adjacent ends, and has a bore 40 extending longitudinally therethrough which is countersunk at its upper end, as shown in Fig. 9, for purposes hereinafter described. Blocks 41 and 42 are welded to the front and rear sides of the housing 34 at the outer edges thereof adjacent its lower end, for purposes hereinafter described. The housing 35 at the opposite side of the truck is a duplicate of the housing 34 but is turned at 180° angle thereto and has an extension 35a thereon which is secured to the web of the beam 21 at its end opposite the housing 34 and is mounted to the channels 25 and 26 in precisely the same manner as is the housing 34, as shown in Fig. 9, and has lugs 43 and 44 thereon corresponding to the lugs 41 and 42 on the housing 34 for purposes hereinafter described.

Housings 45 and 46 are provided which are mounted at each of the corners of the rear end of the platform 20 and are quite similar to the housings 34 and 35, with the housing 45 being illustrated in detail in Fig. 8 of the drawings, and has an extension 47 welded to the inner side thereof which extends inward along the web of the beam 22 and is secured thereto by means of bolts 48, 48. Another extension 49 is provided which is secured to the forward side of the housing 45 and is fitted against the rear side of the channel 24 at its rear end and is bolted to the channel 24 by bolts 50, 50 with a vertical bore 51 therethrough which corresponds with the bore 40 in the housing 34 for the same purpose, as will be hereinafter described, as does the bore 40 perform in the housing 34. The housing 45 has a pair of side lugs 52 and 53 thereon which correspond to the lugs 41 and 42 on the housing 34 and for the same purpose, which will be hereinafter described.

The housing 46 is like the housing 45 in that it has an extension 54 thereon at its forward side which extends behind the channel 26 at its rear end and is bolted thereto, while a second extension 55 extending inward from the housing 46 is bolted to the web portion of the cross beam 22. A vertical bore 56 is provided and the housing 46 has outer lugs 57 and 58 thereon corresponding to the lugs 41 and 42 and 52 and 53 on the housings 34 and 45 respectively.

An outrigger mechanism is provided which may be secured to the rear end of the truck body, or to each side thereof and comprises a pair of beams 59 and 60, each of which have sockets 61, 61 secured to their outer ends and into which hollow posts 62, 62 extend having leg portions 63, 63 telescopically mounted therein, with foot portions 64, 64 being provided, the posts being so arranged that the outer ends of the beams 59 and 60 are of the same height as are the channel sections 23 and 24 on the side of the truck. A top brace 65 is provided at the outer end of the outrigger mechanism, with cross braces 66, 66 being supplied, so that the outrigger mechanism is sufficiently strong to support the loaded carriage which travels upon it. Triangular shaped track rails 67, 67 are provided which are mounted upon the top edges of the beams 59 and 60, with the sockets 61, 61 extending high enough to form bumper posts for the tracks 67, 67. The inner ends of the beams 59 and 60 have connecting members 68, 68 welded thereto, with the members 68, 68 having hooked portions 69, 69 thereon which engage over the lugs 41 and 42 on the side housing 34, and 52 and 53 on the corner housing 45 to hold the outrigger mechanism in operating relation with the truck platform 20. The outrigger mechanism may also be connected to the side housing 35 and corner housing 46 on the opposite side of the truck and to the rear housings 45 and 46 to extend rearward of the truck, if desired, so that cubes of blocks may be pushed up from the ground on either side of the truck or from the rear end of the truck as may be desired.

A short triangular track rail 70 is secured to a base member 71 which is mounted on the end of an axle 72 operating in the bore 40 of the housing 34, the axle 72 having a reduced end portion 73 which extends into a collar 74 which is secured to the reduced end portion 73 of the axle 72 by a key 75. A segment shaped member 76 is integrally formed with the collar 74 to which a clevis 77 is connected by a bolt 78, with a rod 79 being connected to the clevis 77 which extends towards the rear end of the platform 20. A second clevis 80 is attached to the segment member 76 and has a rod 81 secured thereto which extends alongside of the web of the cross beam 21 to the housing 43 on the opposite side of the platform 20. An upper ball bearing cage 82 is fitted into the upper end of the bore 40, while a lower bearing cage 83 is mounted in the lower end of the bore 40 around the reduced end 73 of the axle 72, with a handle 83 secured to the lower end of the axle for the rotation of the axle 72 whereby the track rail 70 is aligned with the track rails 28 and 30 on the channels 23 and 24 or with the cross track rail 32 on the cross beam 21 and the track rail 67 on the outrigger beam 59.

The corner housing 45 has an axle 85 mounted therein in the bore 51 with a short track rail 86 mounted on the upper end thereof and a collar 87 at the lower end having a segment 88 thereon to which a clevis 89 is attached and to which the rod 79 is connected at its rear end. A second clevis 90 is attached to the segment 88 at its opposite side to which a rod 91 is attached which leads to the housing 46 at the opposite corner of the platform 20. A short track rail 92 is mounted upon an axle 93 which is fitted into the bore 56 in the housing 46 and has a collar 94 keyed thereto which includes a segment 95. The segment 95 has a clevis 96 attached to one side thereof to which the rod 91 is connected, and a clevis 97 is attached to the opposite side of the segment 95, with a rod 98 being connected to the clevis 97, which rod 98 extends forward alongside the channel 26 forward to the housing 35. The housing 35 has a short triangular track rail 99 mounted thereon upon the upper end of an axle 100 mounted in a vertical bore in the housing 35 with collar 101 therearound at its lower end, which has a segment 102 integrally formed therewith to which a clevis 103 is connected, which has the rod 98 connected to the segment 102 which, in turn, has the transversely extending rod 81 connected to the clevis 104.

The short track rails 76, 90, 92 and 99 mounted over the housings 34 and 35 and 45 and 46 are rotatably mounted through an arc of 90° and can be placed in alignment with the longitudinally extending rails 28 and 30 and 29 and 31 or with the transverse rails 32 and 33 and 67, 67, so that the carriage hereinafter described can travel longitudinally of the platform or can travel transversely of the truck platform onto the outrigger mechanism which can be located at either side of the truck. The outrigger mechanism can be located at the rear of the truck platform with its rails 67, 67 aligned with the track rails 30 and 31 and the tracks 86 and 92 so that the carriage can be moved off of the rear end while the operator standing alongside of the truck, by movement of the handle 84, can align the short sections of track with either the longitudinal or transverse tracks in order that the carriage can be moved to its desired location.

The carriage comprises a main frame 105 and a squeeze frame 106 of rectangular form mounted upon the main frame by being suspended therefrom, as hereinafter described, the said main frame comprising a plurality of beams 107, 108, 109 and 110, the beams 107 and 109 being opposite each other and forming the sides of the frame 106 while beams 108 and 110 are also opposite each other and form the ends of the frame 106, these beams arranged together at their meeting ends with legs 111, 112, 113 and 114, with triangular shaped reinforcing members 115 being provided which are welded to the structure. The legs 111 and 114 have rotating caster frames 117 and 118 at their lower ends, which said caster frames 117 and 118 include ball bearing caster mounting housings 119, 119 thereon, with caster wheels 120, 120 mounted in the said frames having V-shaped channels in their treads which roll upon the V-shaped rails on top of the platform and outrigger such as 28 and 29, 30 and 31 and over the outrigger rails 67, 67 as the cubes transported by the carriage are moved from one place to another.

Figure 10:
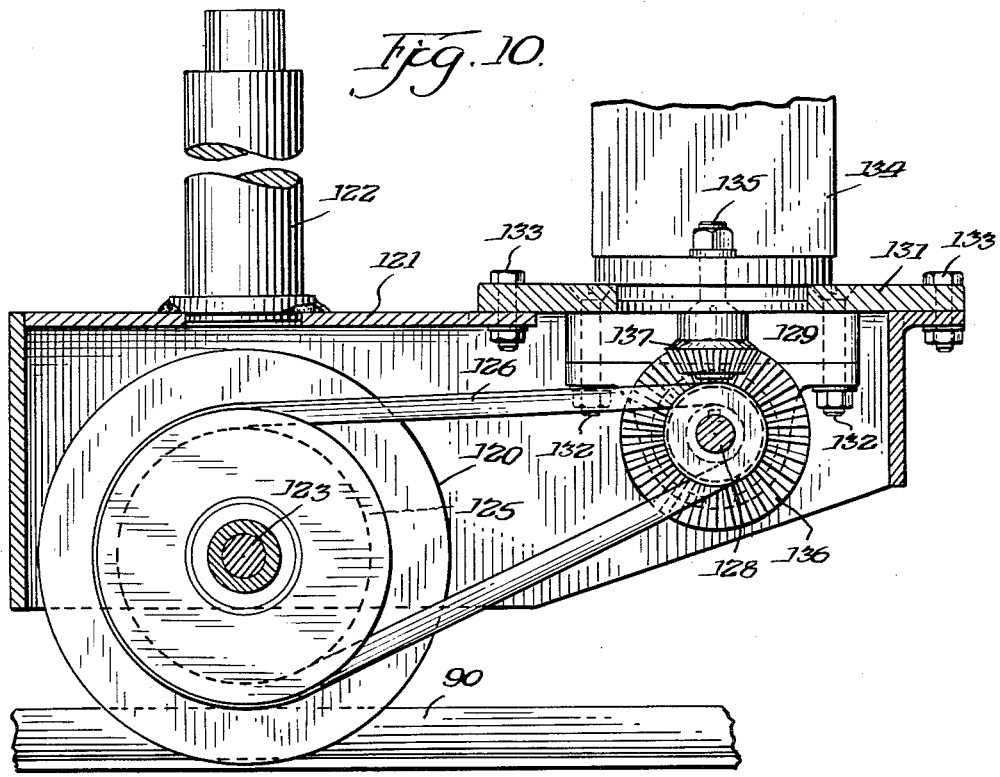
Fig. 10 is a detailed elevational view of one of the power casters.
Figure 11:
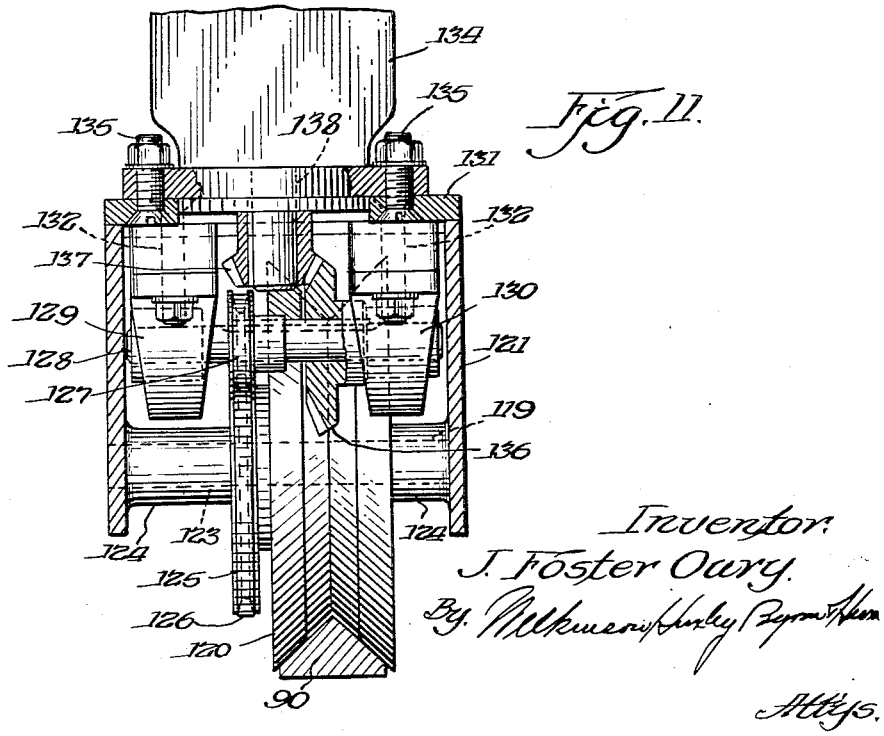
Fig. 11 is a vertical end view taken partially in section of movable caster shown in Fig. 10.

The legs 112 and 113 have power driven casters secured thereto at their lower ends, one of such casters being illustrated in detail in Figs. 10 and 11 of the drawings, and comprise a housing 121 having a vertical axle 122, which projects axially into the legs 112 and 113, a caster wheel 120 mounted therein and having a V-shaped channel tread mounted upon an axle 123, suitably mounted trunnions 124, 124 integrally formed with the housing 121, with a caster wheel 120 having a belt wheel 125 mounted thereon over which a belt 126 is mounted, which belt leads to a pulley 127 mounted upon a shaft 128 mounted in bearing blocks 129 and 130 which are secured to a top plate 131 by means of bolts 132, 132, the top plate 131 being secured to the housing 121 by means of bolts 133, 133 and supporting a two-way hydraulic motor 134 under the control of the operator, as hereinafter described, which is secured to the top plate 131 by means of bolts 135, 135. A pinion 136 is mounted on the shaft 128 which engages with a second pinion 137 on a shaft 138 driven by the motor 134 by means of which power is communicated to the caster wheel 120. The axle 122, which extends upward from the caster frame 121, is mounted in a ball bearing housing 119 so that the entire caster frame swivels about the axle 122 as an axis as the caster wheel 120 rests upon one of the short sections of track 90 under the control of the operator through the use of the handle 84, as hereinabove described. The power driven casters 121, 121 are secured only to the legs 112 and 113, so that the carriage 105 can be caused to move over the platform of the truck and onto the outriggers, as may be desired, through the operation of the hydraulic motors carried by the power casters 121, 121 under the control of the operator, as will be hereinafter described.

The squeeze frame 106 is rectangular in form and is composed of squeeze beams 139 and 140 positioned opposite each other, each of these beams 139 and 140 being of a box type and have squeeze plates 141 and 142 thereon which have built-up upper squeeze pads 143, 143 and lower squeeze pads 144, 144 thereon made of rubber or other elastic material and which grip the lowermost layer 145 of a cube 146 of blocks on the ends of the upper and lower walls of the individual blocks making up the layer 145 and gripping the lowermost layer 145 with sufficient force to bring the ends of the blocks making up this layer into sufficient frictional contact with each other so that the lower layer of blocks 145 forms a supoprting floor or pallet for the tiers or layers of blocks superimposed thereon, so that the cubicle 146 can be moved as a unit from a place on the ground adjacent a truck on either side thereof or over the rear end onto selected positions on the platform 20 of the truck or from the truck onto the ground to selected positions, as may be desired.

A cross beam 147 is secured at one of its ends to one end of the squeeze beam 139 and has a hydraulic ram 148 mounted thereon with a piston therein and has a piston rod 149 which is connected to one end of the squeeze beam 140. The ram 148 has hose connections 150 and 151 leading to a hydraulic control valve 152 (Fig. 14) under the control of the operator. A second cross beam 153 is secured at one of its ends to the opposite end of the squeeze beam 139 from the cross beam 147, and has a hydraulic ram 154 thereon with a piston 155 therein which is connected thereto which is connected to the hose 150, with a second hose 157 connected to the ram 148 and to the hose 151. The hydraulic rams 148 and 154 are located towards the lower sides of the cross beams 147 and 153 upon which they are mounted, so that in the application of pressure to the squeeze beams 139 and 140 the major portion of such pressure is exerted in a plane extending through the bottom walls of the lowermost tier of blocks because of the solid outside walls of the blocks and through the squeeze pads 143, 143, and in applying the force at this point there is less likelihood of the blocks canting or turning when pressure is applied to them so as to form a pallet or trussed flooring for the cubes which are being handled.

Hose tensioning means consisting of a pair of arms 156a and 157a whcih are secured at one of their ends to the top of the beam 109 are provided between which a pulley 158 is mounted, with a cable 159 attached thereto and connected to a sheave 160 which has a plurality of grooved pulleys 161, 161 mounted therein, with an axle 162 which is mounted in a bracket 163 secured to the beam 109 at one of its ends and has a torsion spring 164 wound thereon, with the cable 159 being fixed to the pulley 158. A pair of arms 165 and 166 is secured at one of their ends to the beam 107 with an axle 167 mounted therein and with a plurality of loosely mounted pulleys 168, 168 mounted thereon, with each hose 151 and 150 being formed into loops 163 and 164 which are threaded around the pulleys 161 and 168, with the block 160 being movable across the frame so that the slack in the cables is taken up by the spring 164 operating through the pulley 158 and cable 159 so the hose 150 and 151 does not become entangled with some of the operating parts of the mechanism, this take-up mechanism being desirable because of the fact that the distance from the valve 152 to the hydraulic rams 148 and 154 varies depending upon whether the squeeze frame 106 is loaded in a position close to the ground or whether they are loaded in the position shown in Figs. 1 and 2 of the drawings and within the carriage 105.

A plurality of cables 171, 172, 173 and 174 are provided which are secured at one of their ends to each corner of the squeeze frame 106 and which provide suspension means for the squeeze frame 106 and for the raising and lowering of the squeeze frame 106 to varying positions. Brackets 175 and 176 are provided which have an axle 177 mounted therein and upon which a plurality of sets of sheaves 178, 179 and 180 are mounted, each sheave having a cable receiving channel therein around its periphery—these sheaves being fixed in position but being freely rotatable upon the shaft 177, with a hydraulic ram 181 being provided which has a forked fixed end 182 attached to the shaft 177 and which has a piston mounted therein which includes a forked end 183 which has a shaft 184 thereon and upon which sets of sheaves 185, 186 and 187 are mounted, each set of sheaves being four in number and having cable receiving channels therearound to receive the cables to which the squeeze frame 106 is attached, as hereinafter described.

In considering the course of the cable 172 whose lower end is attached to the squeeze frame 106, it passes through a pulley 188 mounted upon the carriage frame 105 and across one end of the carriage frame 105 to another pulley 189 and then to the top sheave of the set 178, around this sheave to the top sheave in the set 185, back to the top sheave in the set 179, around this sheave to the top sheave in the set 186, then back to the top sheave 180 and around the uppermost sheave in the set 187 and then to an anchor post 190 which is secured to the carriage frame 105. Considering the cable 171 as the No. 2 cable, it passes upward over a pulley 191, then into one of the channels in the pulley 189 and to the second sheave in the group 178 and thereafter follows the same threading in the second sheave in each one of the sets of sheaves until it is anchored to the pin 184. The cable 167 may be considered as the No. 3 cable in this particular hook-up and passes upward over a pulley 192 and then to the third position on the third sheave from the top in the group 178 and then is threaded through the various sequence of pulleys parallel to the No. 1 cable and is anchored to the pin 190 in the same manner as previously described for the other cables. The cable 174, considering it as the No. 4 cable, extends upward a pulley 193 in the No. 1 position and then downward over the lowermost of the sheaves comprising the group 178 and parallels the other cables through the various series of sheaves and is anchored to the pin 190. Because of the arrangement of the sheaves and the movement of the ram fork 183, the squeeze frame 106 is lifted into position within the carriage frame 105 and when it is in the lowermost position, which may be in the position shown in Fig. 12 of the drawings, the squeeze frame 106 is lowered sufficiently between the outrigger rails and around the cube 146 to allow the squeeze frame 106 to be applied to the bottom layer 145 of the building blocks making up the cube. Because of the considerable amount of friction between the sheaves and cables, a release ram 194 is provided which is secured to the carriage frame 105 by means of a bracket 195 and has a piston 196 therein which has an arm 197 connected to the forked end 183 of the ram 181 which is secured to the shaft 184, so that when the pressure is released on the lifting ram 181 and applied to the release ram, the forked end 183 is pushed towards the ram 181 which causes a shortening of the various loops of the lifting cables and the squeeze frame to be lowered, its movement being under the control of the operator through the valving mechanism hereinafter described and may be slow or rapid, as desired.

The various moving parts of the apparatus are operated by a hydraulic system which is common in its application to many power-operated mechanism at the present time and is well known in the art. The system comprises a pump, usually operated by the motor of the vehicle on which the device is mounted, which is supplied with fluid from a reservoir, both of which means are used in the present construction but are not shown in the drawings.

In Figs. 13 and 14 a diagrammatic showing is made of the various operating parts and in which a hose 198 leads from the pump to the valve 152 from which a return hose 199 leads to the reservoir. There is, of course, a differential in pressure between the hose 198, which is the high pressure line, and the hose 199 conveying the fluid back from the valve 152 of the reservoir, which is a low pressure line. The valve 152 is of the type known in the art as a multiple bank open center valve, of which there are several well-known types on the market. The type used in applicant's device is a "Blackhawk" construction and in which, with the operating apparatus in neutral position, there is a constant flow of fluid under pressure from the pump through the high pressure hose 198 through the valve 152 back to the reservoir through the hose 199, with the pump being constantly operated and with all parts in neutral position, and the flow of fluid under the prescribed and necessary pressure is constant in the circuit just described. The valve 152 has directing valves located therein, having operating stems projecting outward therefrom to which operating levers 200, 201 and 202 are connected, which said levers are connected to rocker shafts mounted in a frame 204 which are secured to the beam 107 constituting the forward side of the carriage 105. The rocker shafts have outwardly projecting arms 205 located thereon to which rods 206, 207 and 208 are attached, which are connected at their lower ends to pivotally mounted operating levers 209, 210 and 211 respectively, with the lever 209 controlling the raising and lowering of the squeeze frame 106 through the lifting ram 181 and the release ram 194 and the lever 211 for the control of the movement of the carriage 105.

For the operation of the squeeze frame, the operator, by moving the lever 209 in one direction, diverts the high pressure line into the hose lines 150 and 156 respectively, which admits pressure to rams 148 and 151 and pulls the two squeeze beams 139 and 140 toward each other to exert pressure upon the lowermost layer 145 of the cube 146. The lever 209, moved in the opposite direction, connects the hose lines 151 and 157 with the high pressure chamber of the valve 152 and the hose 150 and 156 with the low pressure chamber, so that the fluid returns through the valve 152 and the hose 199 to the reservoir, thereby releasing the squeeze frame from the cube. Merely by moving this lever 209 into a set position where pressure is exerted upon the squeeze beams, the lever 209 can remain in position during the operation of the carriage and the carriage can be moved from one position to another and the cube transported along with the carriage to any position desired within the limits of movement of the carriage. Pressure gauges are attached to the lines so the operation is improved as to the pressure on the squeeze frame. In the lifting operation, a hose 212 is connected to the valve 152 at one of its ends and leads to the lifting ram 181 at its opposite end, while another hose 213 is connected to the release ram 194 mounted to act in an opposite direction to the lifting ram 181. Through the proper manipulation of the lever 210, high pressure hydraulic fluid can be admitted to the ram 181 which exerts a pushing force on the shaft 184, thereby lifting the squeeze frame onto the carriage frame to the height desired. If the operator desires to lower the squeeze frame, the operating handle 210 is moved in the opposite direction, thereby admitting high pressure fluid into the hose 213 to the release ram 194 and at the same time diverts pressure from the hose 212 to the low pressure side in the valve 152, thereby permitting the squeeze frame to be lowered as may be desired. The use of the release ram 194 is necessary in this connection because of the varying loads which are supported by the squeeze beam. If a cube is being transported by the squeeze beam there is sufficient weight upon the supporting cables so that a release of the pressure is sufficient to enable the beam to descend through the force of gravity alone, while if it is desired to lower this squeeze beam to pick up a cube lying on the ground when it is empty, the release ram 194 is necessary to force the hydraulic fluid out of the lifting ram 181 into the low pressure side, so that the squeeze frame, when empty, can be easily lowered.

The motors 134, 134 have two pairs of hose lines 214 and 215, and 216 and 217, respectively, leading thereto, each of said lines being connected to the valve 152 and under the control of the operator standing at the side of the frame, and by the movement of the lever 211 each pair of hose 214, 215 and 216, 217 are alternately connected with the high pressure side of the system and the low pressure side through the valve 152. When these lines are connected to the high pressure side of the system, the hydraulic fluid traveling through the motors drives the casters 120, 120 in one direction over the rails on the platform and outrigger, while if the lever 211 is moved in the opposite direction, a reversal of the flow of fluid through the motors is obtained, thus causing the casters 120, 120 to travel in the opposite direction, thereby enabling the operator to move the carriage and the squeeze frame suspended therein into varying positions over the outrigger mechanism and over the longitudinal rails in the platform of the truck to deposit a cube to a desired position on the platform of the truck or to the ground, as may be desired. Bleeder hose 218, 218 are connected to the motors 134, 134 and lead to the low pressure side of the system at all times, so that any building up of back pressure in the motors is prevented and any leakage of the fluid from the high pressure side of the system in its operation through the motors 134, 134 is conducted back to the low side, thus insuring the proper operation of the motors 134.

The operation of the device is exceedingly simple in that the operator preferably stands on the ground at the side of the truck within reach of the control levers aligned upon the side of the carriage at most of the times of operation. The cubes must be prestacked, preferably in the form illustrated in Figs. 1 and 2 of the drawings, and may be stacked one cube on top of the other and be easily handled by the apparatus but, assuming that the carriage is supported by the outrigger mechanism as shown particularly in Fig. 1, the operator lowers the squeeze frame so that it encompasses the cube 146 and is in position to engage the lowermost layer 145 of building blocks. When in this position, the operator, by manipulating the operating handle 209, energizes the rams 148 and 154 to move the squeeze beams 139 and 140 toward each other and into engagement with the lowermost layer of blocks 145, with sufficient force being applied to the squeeze beams to force the series of blocks of layer 145 together very firmly, thereby forming a truss floor for the balance of the cube, with the pads 144 on the lower sides of the squeeze plates 141 and 142 having the greater amount of force applied thereto because of the location of the rams 148 and 154 forcing this layer of blocks together sufficiently tight to enable them to form a pallet to support the other layers of blocks superimposed above the lowermost layer. In this position the operator, by manipulating the handle 210, energizes the lifting ram 181 which raises the squeeze frame 106 to the desired height until it is suspended upon the carriage 105, with the carriage 105 resting upon the outrigger mechanism. The operator has previously manipulated the lever 84 in such position that the rail sections 70, 90, 92 and 99 are aligned with the rails 67, 67 on the outrigger and the transverse rails 32 and 33 on the truck platform, whereupon, by manipulation of the lever 211, the caster motors 134, 134 are energized, causing the carriage and squeeze beam and its lading to travel from the outrigger mechanism onto the truck platform. After the carriage is in proper position on the truck platform, with the casters resting upon the short rail sections 70, 90, 92 and 99, the operator, by grasping the handle 84, aligns these short sections of rails with the longitudinal rails mounted on the truck platform, in which position the operator, by further manipulation of the operating lever 211, causes the carriage to travel toward the forward end of the truck platform where the squeeze frame is lowered and the cube deposited upon the platform of the truck, the squeeze frame released therefrom and elevated to a point where it is clear of the cube 146, in which position the movement of the carriage is reversed and travels to the rear end of the truck where the operation is repeated and the carriage can be manipulated out over another cube, the squeeze frame secured thereto and the second cube deposited on the truck platform immediately behind the first cube. In loading successive cubes onto the trailer, they may be picked up from the ground at the rear of the truck or on either side of the truck by proper positions of the outrigger frame as may be desired. I have shown the outrigger mechanism connected to one side of the truck, but it can be positioned on the opposite side of the truck with the rear end as may be desired.

In unloading the cubes, the reverse operation takes place in that the outrigger mechanism, which has been transported on the truck, is set into position and the rearmost cube on the truck (which may have been deposited upon the floor of the truck with the carriage remaining in position over it) is lifted, the transverse tracks on the truck aligned with the tracks on the outrigger, the cube picked up from the truck and run out onto the outrigger and lowered to the ground, with the squeeze beams being released from the cube and the cube deposited on the ground while the squeeze beam is lifted high into the carriage and the carriage run back over a cube on the truck which is picked up and transported into position and deposited on top of the first cube, if desired, or may be deposited on the ground at the opposite side of the truck or at the rear, as may be desired, until all the cubes have been removed from the truck and placed into the desired positions, either upon the ground for subsequent use in the erection of buildings, or in the yard or warehouse space that may be used for storage purposes.

While I have described more or less precisely the details of construction, I do not wish to be understood as limiting myself thereto, as I contemplate changes in form, the proportion of parts, and the substitution of equivalents as circumstances may suggest or render expedient without departing from the spirit or scope of my invention.

What is claimed is:

1. Block transporting and handling apparatus comprising in combination, a vehicle, a platform on the said vehicle, sets of track rails extending longitudinally of the said platform, each set of longitudinal track rails comprising a plurality of rails in aligned relation with each other, with the adjacent ends of each set of rails being spaced from each other, transverse rails on the said platform in spaced relation with each other, a plurality of housings secured to the frame of the platform at the point of intersection of the transverse rails and the sets of side rails, axles mounted in the said housings, connections between the said axles whereby all of said axles may be simultaneously rotated, spaced outrigger beams detachably connected to one pair of housings at one of their ends, supports for said beams at their ends opposite the ones secured to the housings, track rails on the said housings, track sections on the said axles of sufficient length to span the distance between adjacent ends of the side rails and also the transverse rails and the rails on the outrigger beams, means to rotate the said axles and track sections mounted thereon to align the said track sections with the said side rails or the transverse rails and the rails on the outrigger beams, a movable carriage movable on the said rails, a squeeze frame, flexible connections between the carriage and squeeze frame and power operated rams operatively connected with the flexible connections between the carriage and squeeze frame whereby the said squeeze frame is raised and lowered.

2. Block transporting and handling apparatus comprising in combination, a vehicle, a platform on the said vehicle, sets of track rails extending longitudinally of the said platform, each set of longitudinal track rails comprising a plurality of rails in aligned relation with each other, with the adjacent ends of each set of rails being spaced from each other, transverse rails on the said platform in spaced relation with each other, a plurality of housings secured to the frame of the platform at the point of intersection of the transverse rails and the sets of side rails, axles mounted in the said housings, fixed collars on the said axles, rods connecting all of the said collars together whereby all of the said axles may be rotated, spaced outrigger beams detachably connected to one pair of housings at one of their ends, supports for said beams at their ends opposite the ones secured to the housings, track rails on the said housings, track sections on the said axles of sufficient length to span the distance between adjacent ends of the side rails and also the transverse rails and the rails on the outrigger beams, means to rotate the said axles and track sections mounted thereon to align the said track sections with the said side rails or the transverse rails and the rails on the outrigger beams, a movable carriage movable on the said rails, a squeeze frame, flexible connections between the carriage and squeeze frame and power operated rams operatively connected with the flexible connections between the carriage and squeeze frame whereby the said squeeze frame is raised and lowered.

3. Block transporting and handling apparatus comprising in combination, a vehicle, a platform on the said vehicle, sets of track rails extending longitudinally of the said platform, each set of longitudinal track rails comprising a plurality of rails in aligned relation with each other, with the adjacent ends of each set of rails being spaced from each other transverse rails on the said platform in spaced relation with each other, a plurality of housings secured to the frame of the platform at the point of intersection of the transverse rails and the sets of side rails, axles mounted in the said housings, fixed collars on the said axles, rods connecting all of the said collars together whereby all of the said axles may be rotated, an operating handle on one of said collars, spaced outrigger beams detachably connected to one pair of housings at one of their ends, supports for said beams at their ends opposite the ones secured to the housings, track rails on the said housings, track sections on the said axles of sufficient length to span the distance between adjacent ends of the side rails and also the transverse rails and the rails on the outrigger beams, means to rotate the said axles and track sections mounted thereon to align the said track sections with the said side rails or the transverse rails and the rails on the outrigger beams, a movable carriage movable on the said rails, a squeeze frame, flexible connections between the carriage and squeeze frame and power operated rams operatively connected with the flexible connections between the carriage and squeeze frame whereby the said squeeze frame is raised and lowered.

4. Block transporting and handling apparatus comprising in combination, a vehicle, a platform on the said vehicle, sets of track rails extending longitudinally of the said platform, each set of longitudinal track rails comprising a plurality of rails in aligned relation with each other, with the adjacent ends of each set of rails being spaced from each other, transverse rails on the said platform in spaced relation with each other, a plurality of housings secured to the frame of the platform at the point of intersection of the transverse rails and the sets of side rails, the said housings having spaced lugs on their outer sides, axles mounted in the said housings, fixed collars on the said axles, rods connecting all of the said collars together whereby all of the said axles may be rotated, an operating handle on one of said collars, spaced outrigger beams having hooked ends for engagement with the lugs on the said housings, support legs at the ends of the outrigger beams opposite the hooked ends, supports for said beams at their ends opposite the ones secured to the housings, track rails on the said housings, track sections on the said axles of sufficient length to span the distance between adjacent ends of the side rails and also the transverse rails and the rails on the outrigger beams, means to rotate the said axles and track sections mounted thereon to align the said track sections with the said side rails or the transverse rails and the rails on the outrigger beams, a movable carriage movable on the said rails, a squeeze frame, flexible connections between the carriage and squeeze frame and power operated rams operatively connected with the flexible connections between the carriage and squeeze frame whereby the said squeeze frame is raised and lowered.

5. Block handling and transporting apparatus comprising in combination, a vehicle, a platform on said vehicle, sets of track rails extending longitudinally of the platform, each set comprising a plurality of track rails in aligned relation with each other with adjacent ends of each set of track rails spaced from each other, transversely extending rails on the platform in spaced relation with each other, housings secured to the frame of the platform at the point of intersection of the transverse rails and the longitudinal rails, rotatable rail sections mounted in said housings whereby continuous longitudinal and transverse tracks are formed, a pair of outrigger beams detachably connected to the said platform at one of their ends, ground supports for the said beams at their opposite ends, tracks on the said beams aligned with the transverse tracks when the outrigger beams are secured to the side of the platform and with the longitudinal rails when positioned at the rear of the platform, a carriage mounted on the said rails comprising a main frame, legs depending from the main frame, pivotally mounted casters in the said legs, hydraulic motors connected with some of said casters whereby the carriage is power-actuated over the platform and outrigger apparatus, a block carrying frame mounted on the carriage and raising and lowering means connected with the mounting means for the block carrying frame and the carriage.

6. Block handling and transporting apparatus comprising in combination, a vehicle, a platform on said vehicle, sets of track rails extending longitudinally of the platform, each set comprising a plurality of track rails in aligned relation with each other with adjacent ends of each set of track rails spaced from each other, transversely extending rails on the platform in spaced relation with each other, housings having spaced lugs on their outer sides secured to the frame of the platform at the point of intersection of the transverse rails and the longitudinal rails, rotatable rail sections mounted in said housings whereby continuous longitudinal and transverse tracks are formed, a pair of outrigger beams having hooks at one of their ends for engagement with the lugs on the said housings detachably connected to the said platform at one of their ends, ground supports for the said beams at their opposite ends, tracks on the said beams aligned with the transverse tracks when the outrigger beams are secured to the side of the platform and with the longitudinal rails when positioned at the rear of the platform, a carriage mounted on the said rails comprising a main frame, legs depending from the main frame, pivotally mounted casters in the said legs, hydraulic motors connected with some of said casters whereby the carriage is power-actuated over the platform and outrigger apparatus, a block carrying frame mounted on the carriage and raising and lowering means connected with the mounting means for the block carrying frame and the carriage.

7. Block handling and transporting apparatus comprising in combination, a vehicle, a platform on said vehicle, sets of track rails extending longitudinally of the platform, each set comprising a plurality of track rails in aligned relation with each other with adjacent ends of each set of track rails spaced from each other, transversely extending rails on the platform in spaced relation with each other, housings secured to the frame of the platform at the point of intersection of the transverse rails and the longitudinal rails, rotatable rail sections mounted in said housings whereby continuous longitudinal and transverse tracks are formed, a pair of outrigger beams detachably connected to the said platform at one of their ends, ground supports for the said beams at their opposite ends, tracks on the said beams aligned with the transverse tracks when the outrigger beams are secured to the side of the platform and with the longitudinal rails when positioned at the rear of the platform, a carriage mounted on the said rails comprising a main frame, legs depending from the main frame, pivotally mounted casters in the said legs, hydraulic motors connected with some of said casters whereby the carriage is power-actuated over the platform and outrigger apparatus, a squeeze frame suspended from the carriage frame by cables connected to each of said members, and hydraulically operated means whereby the squeeze frame is raised and lowered.

References Cited in the file of this patent
UNITED STATES PATENTS

| | | |
|---|---|---|
| 1,584,517 | Dinkelberg | May 11, 1926 |
| 2,469,575 | Ralston et al. | May 10, 1949 |
| 2,586,264 | Rose | Feb. 19, 1952 |
| 2,605,914 | Hala | Aug. 5, 1952 |
| 2,631,885 | Ault | Mar. 17, 1953 |
| 2,746,619 | Kuhlenschmidt et al. | May 22, 1956 |